United States Patent
Zhong et al.

(10) Patent No.: US 9,356,740 B2
(45) Date of Patent: May 31, 2016

(54) METHOD, APPARATUS, AND SYSTEM FOR FACILITATING RANDOM ACCESS

(71) Applicant: Huawei Technologies Co., LTD, Shenzhen (CN)

(72) Inventors: Yi Zhong, Chengdu (CN); Shuang Li, Shanghai (CN); Dongli Yang, Shanghai (CN); Jinling Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 14/273,401

(22) Filed: May 8, 2014

(65) Prior Publication Data

US 2014/0241318 A1    Aug. 28, 2014

Related U.S. Application Data

(63) Continuation of application No. PCT/CN2011/082062, filed on Nov. 10, 2011.

(51) Int. Cl.
| | |
|---|---|
| *H04W 4/00* | (2009.01) |
| *H04L 1/18* | (2006.01) |
| *H04W 74/08* | (2009.01) |
| *H04W 56/00* | (2009.01) |

(52) U.S. Cl.
CPC .......... *H04L 1/1812* (2013.01); *H04W 56/0045* (2013.01); *H04W 74/0833* (2013.01)

(58) Field of Classification Search
None
See application file for complete search history.

(56) References Cited

U.S. PATENT DOCUMENTS

| | | |
|---|---|---|
| 6,633,559 B1 | 10/2003 | Asokan et al. |
| 2009/0156194 A1 | 6/2009 | Meylan |
| 2009/0207771 A1 | 8/2009 | Lindskog et al. |
| 2009/0238141 A1* | 9/2009 | Damnjanovic et al. ....... 370/331 |
| 2011/0103499 A1* | 5/2011 | Cheng et al. .................. 375/260 |
| 2011/0128873 A1 | 6/2011 | Farag |
| 2012/0033648 A1* | 2/2012 | Papasakellariou et al. ... 370/336 |
| 2012/0113831 A1* | 5/2012 | Pelletier et al. ............... 370/252 |
| 2012/0300715 A1 | 11/2012 | Pelletier et al. |
| 2013/0028198 A1 | 1/2013 | Yamada |
| 2013/0039193 A1* | 2/2013 | Yin et al. ...................... 370/252 |

FOREIGN PATENT DOCUMENTS

| | | |
|---|---|---|
| CN | 1378761 A | 11/2002 |
| CN | 101651529 A | 2/2010 |
| CN | 101904212 A | 12/2010 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 10), 3GPP TS 36.213, V10.3.0, Sep. 2011, 122 pages.

(Continued)

*Primary Examiner* — Kibrom T Hailu
(74) *Attorney, Agent, or Firm* — Slater Matsil, LLP

(57) ABSTRACT

A PRACH preamble sequence being sent by the UE is received. An RAR in response to the PRACH preamble sequence is generated. The RAR includes a TA command. The TA command includes an integer value that is greater than 1282. The integer value alone is capable of determining a TA supporting the UE to perform an uplink time alignment. The RAR is then sent to the UE.

19 Claims, 7 Drawing Sheets

(56) References Cited

FOREIGN PATENT DOCUMENTS

| CN | 101990295 A | 3/2011 |
|---|---|---|
| CN | 102215096 A | 10/2011 |

OTHER PUBLICATIONS

Extended European Search Report received in Application No. 11867487.8-1852, Nov. 15, 2013, 6 pages.

International Search Report received in Application No. PCT/CN2011/082062, mailed Aug. 23, 2012, 18 pages.

Alcatel-Lucent, et al., "Analysis of impact of cell range extension," 3GPP TSG-RAN WG1 #58bis, R1-093762, Miyazaki, Japan, Oct. 12-16, 2009, 3 pages.

ZTE, "Simplified MAC RAR for dedicated preamble," 3GPP TSG-RAN WG2 Meeting #66bis, R2-093876, Los Angeles, USA, Jun. 29-Jul. 3, 2009, 4 pages.

MSTAR Semiconductor, "Specification of TDD LTE Maximum Timing Advance," TSG-RAN Working Group 4 (Radio) meeting #61, R4-116005, San Francisco, Nov. 14-18, 2011, 4 pages.

Xu, H. et al., "Manufacture of Hourglass-shaped Solder Joint by Induction Heating Reflow," 2008 International Conference on Electronic Packaging Technology & High Density Packaging, Date of Conference: Jul. 28-31, 2008, 5 pages.

3rd Generation Partnership Project; Technical Specification Group Radio Access Network; Evolved Universal Terrestrial Radio Access (E-UTRA); Physical layer procedures (Release 10), 3GPP TS 36.213, V10.0.1, Dec. 2010, 98 pages.

\* cited by examiner

METHOD, APPARATUS, AND SYSTEM FOR FACILITATING RANDOM ACCESS

This application is a continuation of co-pending International Application No. PCT/CN2011/082062, filed Nov. 10, 2011, which is hereby incorporated by reference in its entirety.

TECHNICAL FIELD

Embodiments of the present invention relates to the field of communications technologies, and in particular to a method, an apparatus, and a system for facilitating random access of a user equipment (UE).

BACKGROUND

A long term evolution (LTE) system requires time alignment of uplink signals coming from different UEs to an evolved NodeB (eNB), so as to ensure orthogonality of the uplink signals between UEs and help eliminate intra-cell interference. Time alignment of uplink transmission is implemented by performing timing advance (TA) at a UE side.

Currently, a UE first sends a physical random access channel (PRACH) preamble sequence in uplink during initial access to an LTE network. After measuring the preamble sequence, an eNB returns a TA command to the UE by using a random access response (RAR) message. The UE performs corresponding uplink time alignment according to the TA command in the received RAR message. An amount of the time alignment is given by $N_{TA}=T_A \times 16T_s$, where $T_A$ is the value or the index value of the TA command, and $T_s=1/(15000*2048)\text{s}=0.52\ \mu\text{s}$. The value of the TA command returned to the UE from the eNB ranges from 0 to 1282, and accordingly, the value of TA ranges from 0 ms to 0.67 ms, which is capable of supporting only comparatively small coverage.

SUMMARY OF THE INVENTION

According to a first aspect, a method of facilitating random access of a UE is provided. A PRACH preamble sequence being sent by the UE is received. An RAR in response to the PRACH preamble sequence is generated, the RAR including a TA command, the TA command including an integer value being greater than 1282, and the integer value alone being capable of determining a TA supporting the UE to perform an uplink time alignment. The RAR is then sent to the UE.

According to a second aspect, an apparatus is provided. The apparatus includes at least one processor configured to receive a PRACH preamble sequence being sent by a UE; generate a RAR in response to the PRACH preamble sequence, the RAR including a TA command, the TA command including an integer value being greater than 1282, and the integer value alone being capable of determining a TA supporting the UE to perform a uplink time alignment; and send the RAR to the UE.

According to a third aspect, a system is provided. The system includes a base station in communication with a UE. The base station includes at least one processor configured to receive a PRACH preamble sequence being sent by the UE; generate a RAR in response to the PRACH preamble sequence, the RAR including a TA command, the TA command including an integer value being greater than 1282, and the integer value alone being capable of determining a TA supporting the UE to perform a uplink time alignment; and send the RAR to the UE.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The following describes the technical solutions according to the embodiments of the present invention with reference to the accompanying drawings in the embodiments of the present invention.

It should be understood that the technical solutions in the present invention may apply to various communication systems, such as, Global System for Mobile Communications (GSM) system, Code Division Multiple Access (CDMA) system, Wideband Code Division Multiple Access (WCDMA) system, General Packet Radio Service (GPRS) system, LTE system, Advanced Long Term Evolution (LTE-A) system, and Universal Mobile Telecommunication System (UMTS). The embodiments of the present invention do not set a limitation on the applicable communication systems. For ease of description, the embodiments of the present invention will take an LTE network as an example for description.

The embodiments of the present invention may apply to radio networks of different standards. Radio access networks in different systems may include different network elements. For example, network elements of an LTE or LTE-A radio access network includes an eNB, and network elements of a WCDMA radio access network include a radio network controller (RNC) and a NodeB. Similarly, other radio networks, such as Worldwide Interoperability for Microwave Access (WiMax) may also use solutions similar to those in the embodiments of the present invention. Related modules in a base station system may be different. The embodiments of the present invention do not set a limitation on the applicable network elements. But for ease of description, an eNB is taken as an example for description in the following embodiments.

It should also be understood that a terminal in the embodiments of the present invention may also be called a user equipment (UE), a mobile station (MS), a mobile terminal (MT), and the like. And a terminal may communicate with one or more core networks over a radio access network (RAN). For example, a terminal may be a mobile phone or a cellular phone, a computer with a mobile terminal, or a portable, pocket-sized, hand-held, computer-embedded, or vehicle-mounted mobile apparatus.

In LTE, a TA command carried in an RAR message is 11 bits long, and the range of the value of the TA command included in the TA command is defined as 0 to 1282. The maximum amount of time alignment is $1282 \times 16 T_s$, corresponding to a distance of $1282 \times 16/(15000 \times 2048) \times 300000 = 200.3125$ km. This means that the maximum supported radius of a cell is 100 km. A cell with larger coverage cannot be supported.

Therefore, time alignment for cell coverage with a radius of more than 100 km is an important issue that needs to be addressed for access to a cell with coverage over a long distance.

According to embodiments of the present invention, the length and/or definition of the TA command may be expanded to address the issue in a LTE network.

Figure 1:
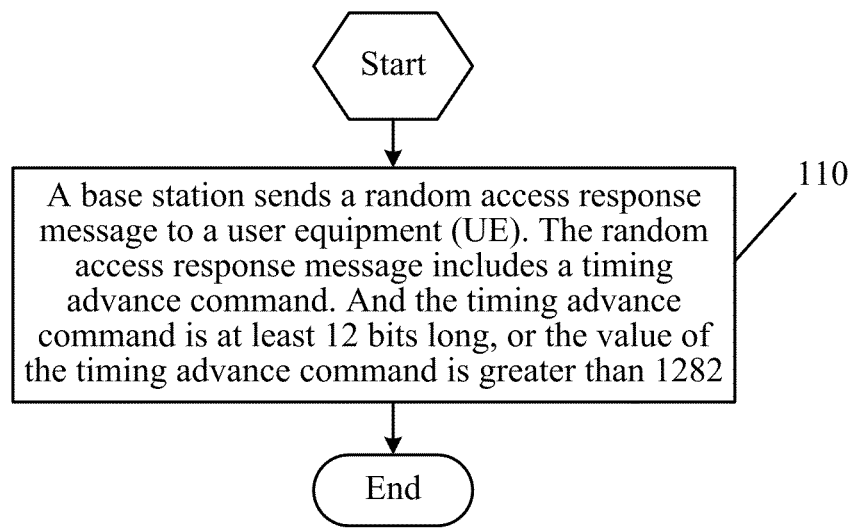
FIG. 1 shows a communication method according to an embodiment of the present invention.

FIG. 1 shows a communication method according to an embodiment of the present invention. The method shown in FIG. 1 is implemented by a base station.

110. A base station sends an RAR message to a UE. The RAR message includes a TA command. And the TA command is at least 12 bits long, or the value of the TA command is greater than 1282.

For example, the base station sends the RAR message to the UE either during an initial random access of the UE or during a new random access initiated after the UE is out-of-synchronization. The value of the TA command may be obtained by expanding the length of the TA command and/or the definition of the value of the TA command in the RAR message. For example, when the value of the TA command is greater than 1282, cell coverage with a radius of more than 100 km may be supported. In another example, the length of the TA command may be expanded to 12 bits, and accordingly, the value of the TA command may range from 0 to 4095 (including 4095).

According to the embodiment of the present invention, the base station may send to the UE a TA command whose length is at least 12 bits or whose value is greater than 1282 in an RAR message, so that the UE is capable of using a larger amount of time alignment when time alignment is performed. Thereby cell coverage over a comparatively longer distance is supported.

According to the embodiment of the present invention, the base station may send the RAR message to the UE.

According to the embodiment of the present invention, when the value of the timing advance command is any integer between 1282 and 2047 (such as 1283 or 2047), the timing advance command is 11 bits long.

For example, the TA command with a value of 2047 may support access to a cell with coverage over a maximum distance of 160 km. The cell radius may be given by the following formula: $2047 \times 16/(15000 \times 2048) \times 300000/2 = 159.9219$ km.

Alternatively, as another embodiment, the TA command is 12 bits long, and the value of the TA command is any integer between 1282 and 4095 (such as 1283 or 4095).

For example, the 11 bits of the TA command in an RAR message and a reserved 1 bit in the RAR message are used together to indicate the value of the TA command. The reserved bit may be a reserved bit adjacent to the TA command. For example, the TA command with a value of 4095 may support access to a cell with coverage over a maximum distance of 320 km. The cell radius may be given by the following formula: $4095 \times 16/(15000 \times 2048) \times 300000/2 = 319.9219$ km. Alternatively, the TA command may be more than 12 bits long. For example, when the TA command is 14 bits long, the cell radius may be given by the following formula: $8195 \times 16/(15000 \times 2048) \times 300000/2 = 640.2344$ km. A TA command with a length of 14 bits may support access to a cell with coverage over a maximum distance of 640 km.

Alternatively, as another embodiment, the method shown in FIG. 1 further includes: sending, by the base station, a first indication information to the UE. The first indication information is used to indicate the length of the TA command that the UE needs to use to perform uplink time alignment.

Alternatively, as another embodiment, the RAR message includes the first indication information.

Alternatively, as another embodiment, the base station sends a message including the first indication information to the UE before sending a RAR message to the UE.

For example, when there are base stations that support different coverage in a communication system, the length of the TA command set by different base station varies. A base station may carry the first indication information in a dedicated signaling or current signaling message to tell the UE how long the TA command in the RAR message is. For example, when a flag bit of the first indication information is 1, it is indicated that the length of the TA command is 12 bits, and thereby the UE should read a 12-bit TA command. When the flag bit is 0 or empty, it is indicated that the length of the TA command is 11 bits, and thereby the UE should read an 11-bit TA command. Alternatively, the length of the TA command may be preset in the UE.

Alternatively, as another embodiment, the base station sends a message including the first indication information to the UE when the UE hands over between the base station and a second base station.

For example, cells (or base stations) with different coverage may coexist in a LTE network, and the range of the value of the TA command used in cells of different coverage varies. When a UE hands over between cells with different coverage, the type of TA command, whose value is used for time alignment, needs to be known. For example, if the UE hands over from a small-coverage cell to a large-coverage cell, the value of the TA command for the large-coverage cell needs to be used to perform time alignment in the large-coverage cell. Contrarily, the value of the TA command for the small-coverage cell needs to be used to perform time adjustment in the small-coverage cell. In this scenario, the base station needs to send indication information to the UE so that the UE knows the value of which type of TA command should be used to perform time alignment. The indication information may be sent by a source base station or a target base station, and may be carried in handover signaling or dedicated signaling. For example, when a flag bit of the first indication information is 1, it is indicated that the length of the TA command is 12 bits, and thereby the UE should read a 12-bit TA command; when the flag bit is 0 or empty, it is indicated that the length of the TA command is 11 bits, and thereby the UE should read a 11-bit TA command.

Alternatively, as another embodiment, the method shown in FIG. 1 further includes: sending, by the base station, information to the UE, in a subframe n, where n is an integer; and receiving, by the base station, a feedback message for the information from the UE in a subframe n+k, where k is an integer greater than or equal to 5.

For example, the setting of k is related to cell coverage. The larger the cell coverage is, the larger the value of k is, so as to increase the air interface processing delay that a system is capable of tolerating. For example, if a cell coverage is 250 km, k may be set to 5. According to an embodiment of the present invention, the time interval, between sending information by a first communication equipment and receiving a feedback message for the information by the first communication equipment, may be increased by modifying HARQ time sequence, so as to increase the air interface processing delay that a system is capable of tolerating, and thereby cell coverage over a comparatively longer distance is supported.

Alternatively, as another embodiment, the method shown in FIG. 1 further includes: receiving, by the base station, information from the UE in a subframe n; and sending, by the base station, a feedback message for information to the UE in a subframe n+k.

According to an embodiment of the present invention, the base station sends information to the UE or receives information from the UE by using at least 2k−1 HARQ processes.

For example, the number of the HARQ processes may range from 1 to 2k. For example, for a cell coverage of 250 km, the number of HARQ processes may be 10 under a FDD mode.

Alternatively, as another embodiment, the method shown in FIG. 1 further includes: sending, by the base station, identification of each HARQ process to the UE, where the identification of each HARQ process is 4 bits long.

Alternatively, as another embodiment, the method shown in FIG. 1 further includes: sending, by the base station, a second indication information to the UE when the UE hands over from a second base station to the base station. The second indication information is used to indicate that when handing over to the base station, the UE should send to the base station a feedback message for information in a subframe n+k.

Alternatively, as another embodiment, the base station sends to the UE a second indication information when the UE hands over from the base station to a second base station. The second indication information is used to indicate that when handing over to the second base station, the UE should send to the second base station a feedback message for information received from the second base station in a subframe n+j.

Alternatively, as another embodiment, the base station sends to the UE a fourth indication information when the UE hands over from a second base station to the base station. The fourth indication information is used to indicate that when handing over to the base station, the UE should receive from the base station a feedback message for information in a subframe n+k.

Alternatively, the base station may send a fourth indication information to the UE when the UE hands over from the base station to a second base station. The fourth indication information is used to indicate that when handing over to the second base station, the UE should receive from the second base station, in a subframe n+j, feedback information for information sent by the UE to the second base station.

Figure 2:
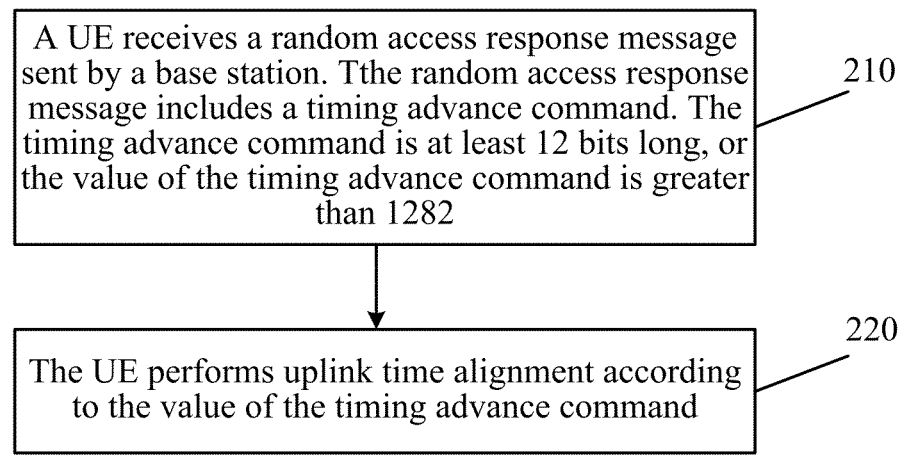
FIG. 2 shows a communication method according to another embodiment of the present invention.

FIG. 2 shows a communication method according to another embodiment of the present invention. The method shown in FIG. 2 is implemented by a UE, and corresponds to the method shown in FIG. 1. Therefore, duplicate description is properly omitted.

210. A UE receives an RAR message sent by a base station. The RAR message includes a TA command. And the TA command is at least 12 bits long, or the value of the TA command is greater than 1282.

220. The UE performs uplink time alignment according to the value of the TA command.

For example, the UE may calculate an amount of the time alignment according to the value of the TA command and perform, according to the calculated amount of the time alignment, alignment on the time for sending uplink signals.

According to the embodiment of the present invention, the base station may send to the UE the TA command whose length is at least 12 bits or whose value is greater than 1282 in the RAR message, so that the UE is capable of using a larger amount of time alignment when performing time alignment, and thereby cell coverage over a comparatively longer distance is supported.

According to an embodiment of the present invention, when the value of the TA command is any integer ranging from 1282 to 2047, the TA command is 11 bits long.

For example, if the value of the TA command is 2047, the corresponding amount of time alignment is 2047× 16$T_s$=2047×0.52 μs=1064.44 μs.

Alternatively, as another embodiment, the TA command is 12 bits long, and the value of the TA command is any integer ranging from 1282 to 4095.

For example, if the value of the TA command is 4095, the corresponding amount of time alignment is 4095× 16$T_s$=4095×0.52 μs=2129.4 μs.

Alternatively, as another embodiment, the method shown in FIG. 2 further includes: receiving, by the UE, a third indication information from the base station. The third indication information is used to indicate the length of the TA command that the UE needs to use to perform uplink time alignment.

Alternatively, as another embodiment, the RAR message includes the first indication information.

Alternatively, as another embodiment, the UE receives a message including the first indication information from the base station before receiving a RAR message from the base station.

Alternatively, as another embodiment, receiving, by the UE, the first indication information from the base station includes: receiving, by the UE, a message including the first indication information from the base station, when the UE hands over between the base station and a second base station.

Alternatively, as another embodiment, the UE receives information from the base station in a subframe n, where n is an integer; and the UE sends to the base station a feedback message for the information in a subframe n+k, where k is an integer greater than or equal to 5.

Alternatively, as another embodiment, the UE sends information to the base station in a subframe n; and the UE receives a feedback message for the information from the base station in a subframe n+k.

Alternatively, as another embodiment, the UE receives information from the base station or sends information to the base station by using at least 2k−1 HARQ processes. The method shown in FIG. 2 further includes: receiving, by the UE, identification of each HARQ process from the base station, where identification of each HARQ process is 4 bits long.

Alternatively, as another embodiment, the method shown in FIG. 2 further includes: receiving, by the UE, a fourth indication information from the base station or a second base station when the UE hands over from the second base station to the base station. The fourth indication information is used to indicate that when handing over to the base station, the UE should receive from the base station a feedback message for information in a subframe n+k.

Alternatively, as another embodiment, the method shown in FIG. 2 further includes: receiving, by the UE, a fourth indication information from the base station or a second base station when the UE hands over from the base station to the second base station. The fourth indication information is used to indicate that when handing over to the second base station, the UE should receive from the second base station, in a subframe n+j, feedback information for information sent by the UE to the second base station.

Alternatively, as another embodiment, the method shown in FIG. 2 further includes: receiving, by the UE, a second indication information from the base station or a second base station when the UE hands over from the second base station to the base station. The second indication information is used to indicate that when handing over to the base station, the UE should send a feedback message for information in a subframe n+k.

Alternatively, as another embodiment, the method shown in FIG. 2 further includes: receiving, by the UE, a second indication information from the base station or a second base station when the UE hands over from the base station to the second base station. The second indication information is used to indicate that when handing over to the second base station, the UE should send to the second base station, in a subframe n+j, a feedback message for information received from the second base station.

Figure 3:
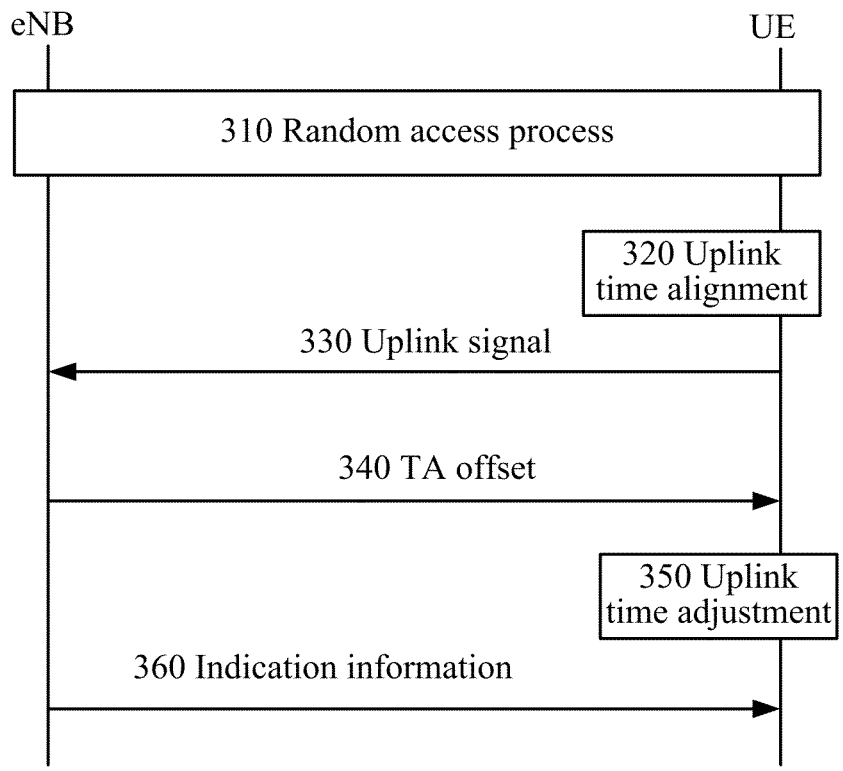
FIG. 3 is a schematic diagram of a communication process according to an embodiment of the present invention.
Figure 4:
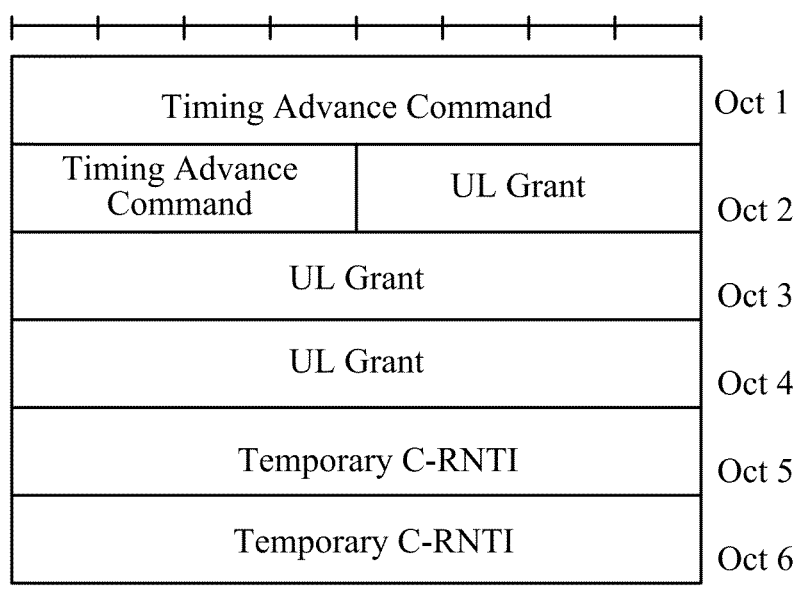
FIG. 4 is a schematic structural diagram of an RAR message according to an embodiment of the present invention.

FIG. 3 is a schematic diagram of a communication process according to an embodiment of the present invention. The embodiment of FIG. 3 is an example of the methods shown in FIG. 1 and FIG. 2. FIG. 4 is a schematic structural diagram of an RAR message according to an embodiment of the present invention.

310. A UE sends a PRACH preamble sequence to an eNB during an initial random access. The eNB calculates an amount of time alignment by measuring the PRACH preamble sequence, and sends an RAR message to the UE. The RAR message includes a TA command and the TA command includes the value of the TA command corresponding to the amount of time alignment.

The value of the TA command may be obtained by expanding the length and/or definition of the TA command in an RAR message of the existing LTE protocol. For example, the range (0-1282) of the value of the TA command defined in the LTE protocol may be expanded to 0-2047, so that access to a cell with coverage over a maximum distance of 160 km may be supported. In addition, referring to FIG. 4, the range of the value of the TA command may be expanded by expanding the length (11 bits) of the TA command. Referring to FIG. 4, the RAR message includes a 12-bit TA command, and in addition, includes an uplink grant (UL Grant) and a cell radio network temporary identifier (C-RNTI). For example, the 11 bits of the TA command in the RAR message defined in the LTE protocol and the adjacent reserved 1 bit are used together to indicate the value of the TA command, so that the length of the TA command may be expanded to 12 bits. Accordingly, the range of the value of the TA command is expanded to 0-4095, and thereby access to a cell with coverage over a maximum distance of 320 km is supported.

In addition, alternatively, when the UE performs random access, the eNB may carry indication information in a dedicated signaling or a current signaling message (for example, an RAR message), where the indication information may use a flag bit to indicate the TA command with which length should the UE read to perform uplink time alignment. For example, flag bit 1 is used to indicate that the UE should read a 12-bit TA command to perform uplink time alignment, and flag bit 0 is used to indicate that the UE should read a 11-bit TA command to perform uplink time alignment.

320. The UE performs initial uplink time alignment according to the value of the TA command. For example, the value of the TA command is represented by $T_A$, and the UE calculates the amount of time alignment according to $N_{TA}=TA\times16T_s$ based on the $T_A$, and performs time alignment based on the value of $N_{TA}$ when sending uplink signals to the eNB.

330. The UE sends uplink signals to the eNB after accessing the LTE system and obtaining initial uplink synchronization.

340. The eNB obtains an offset between the amount of the current TA and that of the former TA by measuring uplink signals sent by the UE. The uplink signals may include a sounding reference signal (SRS), a channel quality indicator (CQI), an HARQ, or data in a physical uplink shared channel (PUSCH). And the eNB sends the offset to the UE, where the offset is 6 bits long and ranges from 0 to 63.

350. The UE performs corresponding time adjustment in a subframe n+6 according to the offset upon receiving the offset in a subframe n. If a subframe n+5 and the subframe n+6 have an overlap due to the TA time adjustment, the UE may transmit a complete subframe n+5 and ignore the subframe n+6.

360. The eNB sends indication information to the UE when the UE hands over between cells (or base stations) supporting different coverage, so as to indicate the TA command with which length that the UE should read to perform uplink time alignment. For example, the eNB carries the indication information in a dedicated signaling or a current signaling message, where the indication information may use a flag bit for indication. For example, flag bit 1 is used to indicate that the UE should read a 12-bit TA command to perform uplink time alignment when the UE hands over from a base stations supporting coverage over a distance of 100 km to a base stations supporting coverage over a distance of 250 km, and flag bit 0 is used to indicate that the UE should read a 11-bit TA command to perform uplink time alignment when the UE hands over from the base stations with a radius of 250 km to the base stations with a radius of 100 km. In addition, the indication information may be sent by a source eNB or a target eNB to the UE during a cell handover. It should be noted that process 360 is optional.

In addition, the LTE system adopts a HARQ technology to eliminate the impact of time variation and multipath fading in wireless mobile channels. In the case where a cell has a maximum radius of 100 km, the HARQ time sequence for a frequency division duplexing (FDD) LTE system may be N+4, that is, a second communication equipment gives a feedback for transmitted information in subframe N+4 and each subframe occupies a 1-ms timeslot. That is, the delay reserved for air interface processing is 4 ms, wherein 1 ms is used for transmitting information or a feedback message and 3 ms is used by a UE or a base station for processing the transmitted information or the feedback message. Multiple HARQ processes or channels are allowed for data transmission to ensure that the second communication equipment (a UE or a base station) may continuously send data in timeslots before the feedback message processing is complete. The maximum number of the HARQ processes is 8. The HARQ may be classified into synchronous HARQ and asynchronous HARQ according to the time when retransmission occurs. In the synchronous HARQ mode, the number or identification (ID) of an HARQ process may be obtained from a subframe number because the transmission time of the HARQ process is fixed, and therefore, a first communication equipment does not need to send the identification of the HARQ process to the UE. In the asynchronous HARQ mode, however, HARQ process transmission may occur at any time, and therefore, the ID of the HARQ process along with its data need to be sent to the UE. In a LTE network, synchronous HARQ is usually used in uplink HARQ, and asynchronous HARQ is usually used in downlink HARQ. For the downlink HARQ, the indication field of an HARQ process ID usually needs to be defined as 3 bits long in the downlink control information format (DCI) 1, DCI 1A, DCI 1B, DCI 1D, DCI 2, DCI 2A, or DCI 2B, of a physical downlink control channel (PDCCH).

For extremely remote cell coverage with a radius of 250 km, the delay between sending air interface radio frequency signals by an eNB and receiving the signals by a UE needs to be additionally considered. For example, when cell coverage with a radius of 100 km is supported, the value of timing advance is about 0.67 ms, and when cell coverage with a radius of 250 km is supported, the value of timing advance is about 1.67 ms. In this case, a maximum of 8 HARQ processes is incapable of meeting requirements for HARQ transmission.

Therefore, the tolerable air interface processing time for coverage over an extremely long distance is an important issue that needs to be addressed for access to a cell with coverage over a long distance.

According to an embodiment of the present invention, the air interface processing delay that a system is capable of tolerating may be increased by expanding the HARQ process and time sequence, so as to address the issue where a UE is denied access to a LTE network in an extremely remote coverage scenario.

Figure 5:
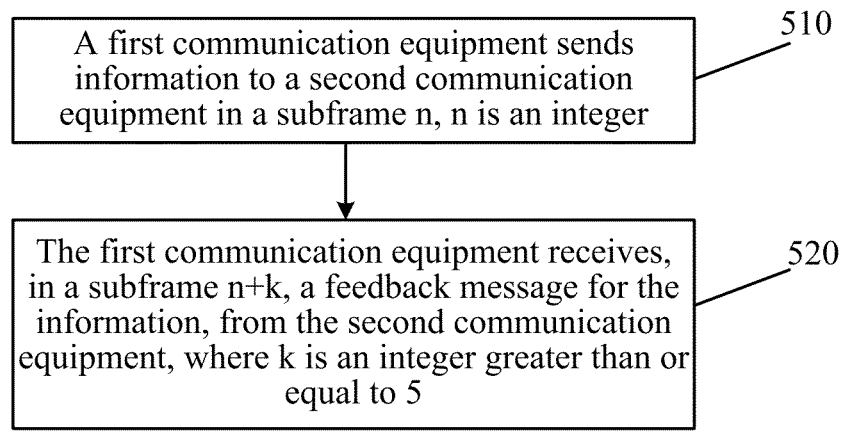
FIG. 5 is a schematic flow chart of a communication method according to another embodiment of the present invention.

FIG. 5 is a schematic flow chart of a communication method according to another embodiment of the present invention. The method shown in FIG. 5 is implemented by a base station or a UE serving as a first communication equipment. The first communication equipment is a first communication equipment in HARQ.

510. A first communication equipment sends information to a second communication equipment in a subframe n, where n is an integer.

520. The first communication equipment receives a feedback message for the information from the second communication equipment in a subframe n+k, where k is an integer greater than or equal to 5.

For example, the first communication equipment may be a UE or a base station, and accordingly, the information may be uplink information or downlink information. The setting of k is related to cell coverage, that is, the larger the cell coverage is, the larger the value of k is, so as to increase the air interface processing delay that a system is capable of tolerating. For example, if the radius of the cell coverage is 250 km, k may be set to 5. The number of the at least one HARQ process may range from 1 to 2k. For example, preferably, for cell coverage with a radius of 250 km, the number of the HARQ processes is 10. The feedback message may be an NACK or ACK message. A feedback message for downlink information may be sent over a PUCCH or PUSCH, and a feedback message for uplink information may be sent over a physical HARQ indicator channel (PHICH).

According to an embodiment of the present invention, the time interval, between sending information by the first communication equipment and receiving the feedback message for the information by the first communication equipment, may be expanded by modifying the HARQ time sequence, so as to increase the air interface processing delay that the system is capable of tolerating, and thereby cell coverage over a comparatively longer distance is supported.

According to an embodiment of the present invention, the first communication equipment sends information by using at least 2k−1 HARQ processes.

Alternatively, as another embodiment, the first communication equipment is a base station, and the second communication equipment is a UE. The method shown in FIG. 5 further includes: resending the information, or sending new information, by the base station to the UE, in any subframe following subframe n+k, according to the feedback message.

For example, when the first communication equipment is a base station, the HARQ is a downlink HARQ. When the downlink HARQ is asynchronous, the time when the base station resends the information or sends new information is not fixed, and which subframe is used for information transmission is subject to the downlink scheduling of the base station. For example, when the feedback message is an ACK message, the base station starts to send new downlink information from a subframe determined by using the downlink scheduling. When the feedback message is an NACK message, however, the base station starts to resend the downlink information from a subframe determined by using the downlink scheduling.

Alternatively, as another embodiment, the first communication equipment is a base station, and the second communication equipment is a UE. The method shown in FIG. 5 further includes: sending, by the base station, identification of each HARQ process to the UE, where the identification of each HARQ process is 4 bits long.

For example, when the first communication equipment is a base station, the HARQ is a downlink HARQ. In the case where the downlink HARQ is asynchronous, the base station sends identification of the HARQ processes to the UE in a DCI of a PDCCH. When cell coverage with a radius of 250 km is supported, the number of HARQ processes is 10, and therefore, 4 bits need to be used for representation of the HARQ processes.

Alternatively, as another embodiment, the first communication equipment is a base station, and the second communication equipment is a UE. The method shown in FIG. 5 further includes: sending, by the base station, a second indication information to the UE when the UE hands over from a second base station to the base station. The second indication information is used to indicate that when handing over to the base station, the UE should send to the base station a feedback message for information in a subframe n+k.

Alternatively, as another embodiment, the first communication equipment is a base station, and the second communication equipment is a UE. The method shown in FIG. 5 further includes: sending, by the base station, a second indication information to the UE when the UE hands over from the base station to a second base station. The second indication information is used to indicate that when handing over to the second base station, the UE should send to the second base station, in a subframe n+j, a feedback message for information received from the second base station.

For example, cells with different coverage may coexist in an LTE network, and the HARQ time sequence used in cells of different coverage varies. When the UE hands over between cells with different coverage, the type of HARQ time sequence for receiving downlink information and providing feedback needs to be known. For example, during a handover from a small-coverage cell to a large-coverage cell, a larger HARQ time sequence needs to be used to provide feedback to downlink information. Contrarily, a smaller HARQ time sequence needs to be used to provide feedback to downlink information. In this scenario, a base station needs to send indication information to a UE so that the UE knows the type of HARQ time sequence for providing feedback to downlink information. The indication information may be sent by a source base station or a target base station, and may be carried in a handover signaling or a dedicated signaling.

Alternatively, as another embodiment, the first communication equipment is a UE, and the second communication equipment is a base station. The method shown in FIG. 5 further includes: resending the information, or sending new information, by the UE to the base station, in a subframe n+2k, according to the feedback message.

For example, when the first communication equipment is a base station, the HARQ is an uplink HARQ. For example, in the case where the uplink HARQ is synchronous, the time when the base station resends the information or sends new information is fixed. For example, when the feedback message is an ACK message, the new information may be sent to the base station in a subframe n+2k; when the feedback message is an NACK message, the uplink information may be resent to the base station in a subframe n+2k.

Alternatively, as another embodiment, the first communication equipment is a UE, and the second communication equipment is a base station. The method shown in FIG. 5 further includes: receiving, by the UE, a fourth indication information from the base station or a second base station when the UE hands over from the second base station to the base station, where the fourth indication information is used to indicate that when handing over to the base station, the UE should receive from the base station a feedback message for information in a subframe n+k.

Alternatively, as another embodiment, the first communication equipment is a UE, and the second communication equipment is a base station. The method shown in FIG. 5 further includes: receiving, by the UE, a fourth indication information from the base station or a second base station when the UE hands over from the base station to the second base station, where the fourth indication information is used to indicate that when handing over to the second base station, the UE should receive from the second base station, in a subframe n+j, feedback information for information sent by the UE to the second base station.

For example, cells of different coverage may coexist in an LTE network, and the HARQ time sequence used in cells of different coverage varies. When the UE hands over between cells with different coverage, the type of HARQ time sequence for sending uplink information and receiving a feedback message needs to be known. For example, during a handover from a small-coverage cell to a large-coverage cell, a larger HARQ time sequence needs to be used to receive feedback to uplink information. Contrarily, a smaller HARQ time sequence needs to be used to receive feedback to uplink information. In this scenario, the base station needs to send indication information to the UE so that the UE knows the type of HARQ time sequence for information transmission. The indication information may be sent by a source base station or a target base station, and may be carried in a handover signaling or a dedicated signaling.

Figure 6:
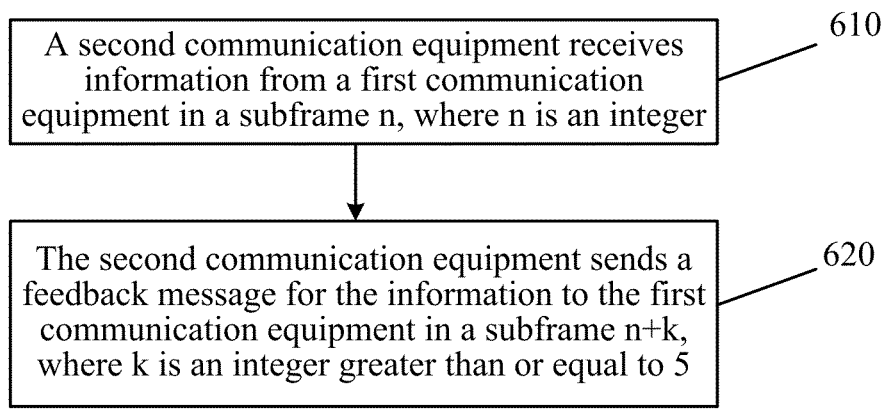
FIG. 6 is a schematic flow chart of a communication method according to another embodiment of the present invention.

FIG. 6 is a schematic flow chart of a communication method according to another embodiment of the present invention. The method shown in FIG. 6 is implemented by a base station or a UE serving as a second communication equipment, and corresponds to the method shown in FIG. 5. Therefore, duplicate description is properly omitted. The second communication equipment is a second communication equipment in a HARQ.

610. A second communication equipment receives information from a first communication equipment in a subframe n, where n is an integer.

620. The second communication equipment sends a feedback message for the information to the first communication equipment in a subframe n+k, where k is an integer greater than or equal to 5.

According to the embodiment of the present invention, the time interval, between sending information by the first communication equipment and receiving a feedback message for the information by the first communication equipment, may be expanded by modifying HARQ time sequence, and increasing the air interface processing delay that a system is capable of tolerating, and thereby cell coverage over a comparatively longer distance is supported.

Alternatively, as another embodiment, the second communication equipment receives information by using at least 2k−1 HARQ processes.

Alternatively, as another embodiment, the first communication equipment is a base station, and the second communication equipment is a UE. The method shown in FIG. 6 further includes: receiving, by the UE, the information resent by or new information sent by the base station, in any subframe following the subframe n+k according to the feedback message.

Alternatively, as another embodiment, the first communication equipment is a base station, and the second communication equipment is a UE. The method shown in FIG. 6 further includes: receiving, by the UE, identification of each HARQ process from the base station, where the identification of each HARQ process is 4 bits long.

Alternatively, as another embodiment, the first communication equipment is a base station, and the second communication equipment is a UE. The method shown in FIG. 6 further includes: receiving, by the UE, a second indication information from the base station or a second base station when the UE hands over from the second base station to the base station. The second indication information is used to indicate that when handing over to the base station, the UE should send a feedback message for information in a subframe n+k.

Alternatively, as another embodiment, the first communication equipment is a base station, and the second communication equipment is a UE. The method shown in FIG. 6 further includes: receiving, by the UE, a second indication information from the base station or a second base station when the UE hands over from the base station to the second base station. The second indication information is used to indicate that when handing over to the coverage of the second base station, the UE should send to the second base station, in subframe n+j, a feedback message for information received from the second base station.

Alternatively, as another embodiment, the first communication equipment is a UE, and the second communication equipment is a base station. The method shown in FIG. 6 further includes: receiving, by the base station, in a subframe n+2k, the information resent or new information sent by the UE.

Alternatively, as another embodiment, the first communication equipment is a UE, and the second communication equipment is a base station. The method shown in FIG. 6 further includes: sending, by the base station, a fourth indication information to the UE when the UE hands over from a second base station to the base station. The fourth indication information is used to indicate that when handing over to the base station, the UE should receive from the base station a feedback message for information in a subframe n+k.

Alternatively, as another embodiment, the first communication equipment is a UE, and the second communication equipment is a base station. The method shown in FIG. 6 further includes: sending, by the base station, a fourth indication information to the UE when the UE hands over from the base station to a second base station. The fourth indication information is used to indicate that when handing over to the second base station, the UE should receive from the second base station, in a subframe n+j, feedback information of information sent by the UE to the second base station.

The following illustrates embodiments of the present invention with reference to specific examples.

The air interface processing delay that a system is capable of tolerating needs to be increased to support cells of larger coverage. For example, in the case where cell coverage with a radius of 250 km is supported, the system needs to tolerate an air interface processing delay 1 ms more than that in the case where cell coverage with a radius of 100 km is supported.

Figure 7:
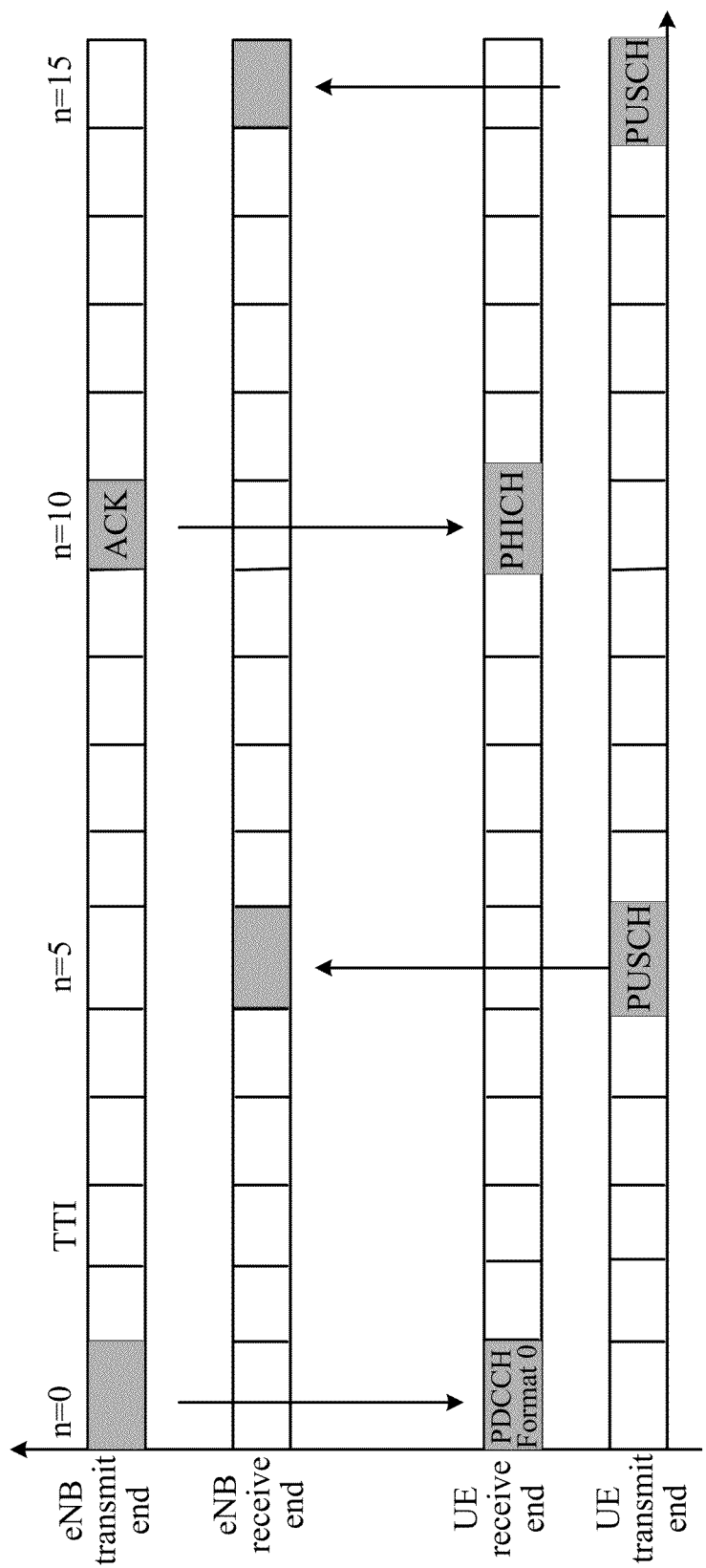
FIG. 7 is a schematic diagram of an uplink HARQ time sequence according to an embodiment of the present invention.

FIG. 7 is a schematic diagram of an uplink HARQ time sequence according to an embodiment of the present invention.

For an uplink HARQ, the uplink HARQ time sequence may be changed from the HARQ time sequence n+4 supporting cell coverage with a radius of 100 km to n+5. In other words, when a UE sends uplink information to a base station in a subframe n, the base station provides, in subframe n+5, a feedback (for example, sends an ACK/NACK message) to uplink signals over a PHICH; and then the UE performs parsing on the PHICH in subframe n+5.

As the uplink HARQ is a synchronous HARQ, the UE will send new uplink information or resend the uplink information in a subframe n+10 according to the ACK/NACK message.

Referring to FIG. 7, the UE sends, in subframe 5, uplink information over a PUSCH, and the eNB receives, in subframe 5, the PUSCH, and performs decoding on the PUSCH. If the decoding succeeds, the eNB sends, in subframe 10, an ACK message over the PHICH to the UE; and the UE performs, in subframe 10, parsing on the PHICH, and sends, in subframe 15, new uplink information to the eNB according to the ACK message obtained through parsing. If the decoding fails, the eNB sends, in subframe 10, an NACK message over the PHICH to the UE; and the UE performs, in subframe 10, parsing on the PHICH, and resends, in subframe 15, the uplink information to the eNB according to the NACK message obtained through parsing.

In an FDD system, a Transmission Time Interval (TTI) is 1 ms, and the number of HARQ processes is about equal to the ratio of Round-Trip Time (RTT) to TTI. Therefore, in the case where the time sequence is changed to n+5, the RTT is changed from 8 ms supporting cell coverage with a radius of 100 km to 10 ms. Therefore, the number of HARQ processes is changed to 10.

If the uplink adopts the adaptive retransmission mode, the eNB may deliver uplink scheduling information to the UE by using DCI 0 (DCI format 0) in a PDCCH. The UE sends new data or performs resending according to the uplink scheduling information.

In addition, when the UE supports a handover between cells of different coverage, the eNB may send indication information to the UE to indicate the type of HARQ time sequence for the UE to transmit uplink information and provide feedback. For example, the eNB carries the indication information in a dedicated signaling or a current signaling message, where the indication information may use a flag bit for indication. For example, when the flag bit is 1, it is indicated that the UE should transmit uplink information and provide feedback according to HARQ time sequence n+5; and when the flag bit is 0 or empty, it is indicated that the UE should transmit uplink information and provide feedback according to HARQ time sequence n+4. In addition, the indication information may be sent by a source eNB or a target eNB to the UE during a cell handover.

Figure 8:
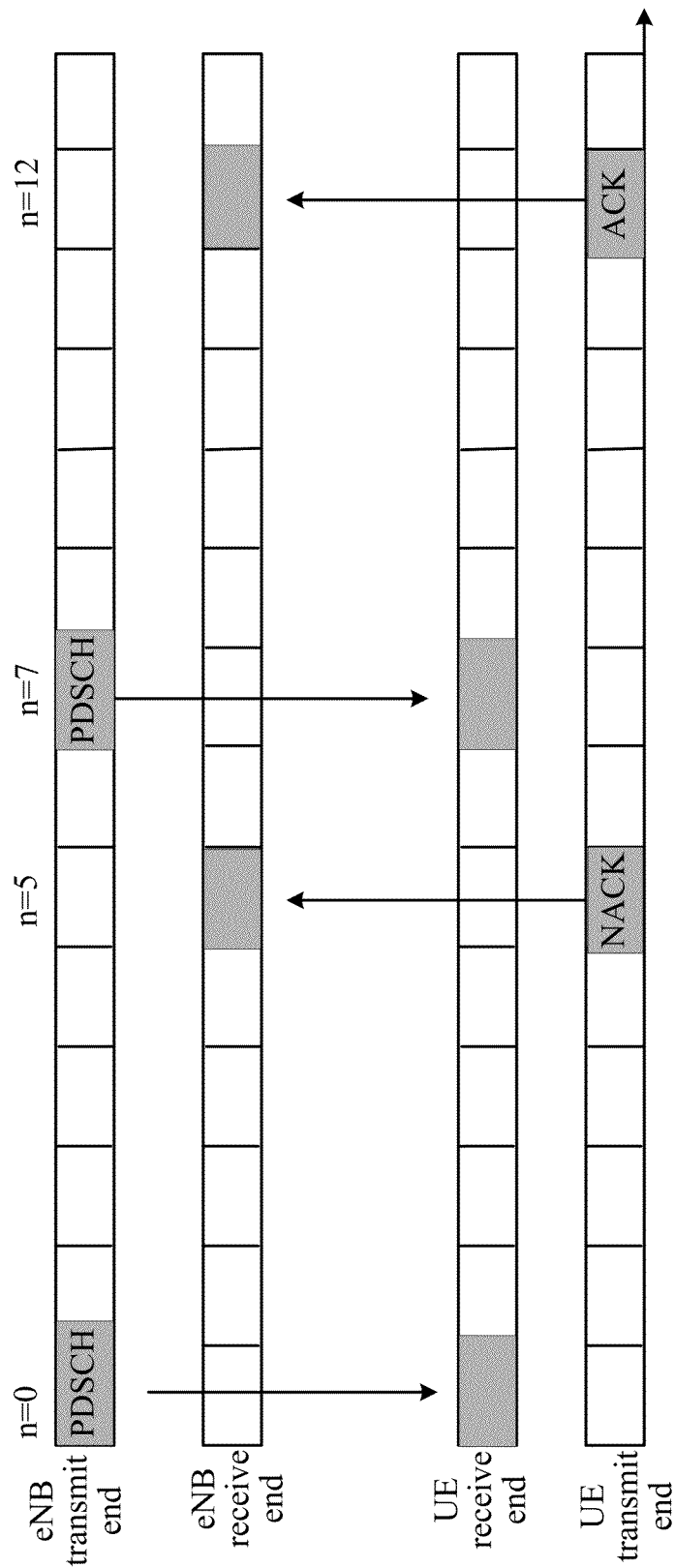
FIG. 8 is a schematic diagram of a downlink HARQ time sequence according to an embodiment of the present invention.

FIG. 8 is a schematic diagram of a downlink HARQ time sequence according to an embodiment of the present invention.

For a downlink HARQ, the downlink HARQ time sequence may be changed from HARQ time sequence n+4 supporting cell coverage with a radius of 100 km to n+5. In other words, when an eNB sends downlink information to a UE in a subframe n, the UE provides feedback to downlink signals over a PUCCH/PUSCH in a subframe n+5, and then the base station performs parsing on the PUCCH/PUSCH in the subframe n+5.

As the downlink HARQ is an asynchronous HARQ, the eNB may start to send, in any subframe following the subframe n+5, new downlink information or resend the downlink information according to the ACK/NACK message. In other words, the subframe in which the eNB starts to send new downlink information or resend the downlink information is determined by using the downlink scheduling of the eNB.

Referring to FIG. 8, the eNB sends, in subframe 0, downlink information over a PDSCH, and the UE receives, in subframe 0, the PDSCH, and performs decoding on the PDSCH. If the decoding fails, the UE sends, in subframe 5, an NACK message to the eNB over a PUCCH/PUSCH. The eNB receives, in subframe 5, the NACK message, and resends, in subframe 7 (possibly being another subframe according to downlink scheduling), the downlink information to the UE according to the NACK message. The UE receives, in subframe 7, the resent downlink information, and performs decoding. If the decoding succeeds, the UE sends, in subframe 12, an ACK message to the eNB over a PUCCH/PUSCH. And the eNB receives, in subframe 12, the ACK message. Then, the eNB will send, in any subframe following subframe 12, new uplink information.

In a downlink HARQ, the number of HARQ processes also is changed to 10. Accordingly, the length of the indication field of an HARQ process ID in the DCI carrying the HARQ ID is set to 4 bits, that is, 1 bit needs to be added to the original 3 bits of DCI 1/DCI 1A/DCI 1B/DCI 1D/DCI 2/DCI 2A/DCI 2B each. In addition, 1 bit may also be added to DCI 0/DCI 3/DCI 3A each to ensure that DCI 0/DCI 3/DCI 3A and DCI 1A are of the same length. This facilitates blind detection and still ensures a different length from DCI 1C, thereby differentiating between DCI 0/DCI 3/DCI 3A and DCI 1C.

In addition, when the UE supports a handover between cells of different coverage, the eNB may send indication information to the UE to indicate the type of HARQ time sequence for the UE to transmit downlink information and provide feedback. For example, the eNB carries the indication information in a dedicated signaling or a current signaling message. The indication information may use a flag bit for indication. For example, flag bit 1 indicates that the UE should transmit downlink information and provide feedback according to HARQ time sequence n+5, and flag bit 0 indicates that the UE should transmit downlink information and provide feedback according to HARQ time sequence n+4. In addition, the indication information may be sent by a source eNB or a target eNB to the UE during a cell handover.

Above embodiments are not completely independent, and can be used in combination as required. Such variations all fall within the scope of the embodiments of the present invention. For example, by combining the embodiment of FIG. 3 with the embodiment of FIG. 7 and/or FIG. 8, an optimal air interface processing delay may be obtained while access to a cell with coverage over an extremely long distance is supported.

The preceding describes methods for implementing cell coverage over a long distance according to embodiments of the present invention. The following describes, by referring to FIG. 9 to FIG. 12, a base station, a UE and a communication equipment according to embodiments of the present invention.

Figure 9:
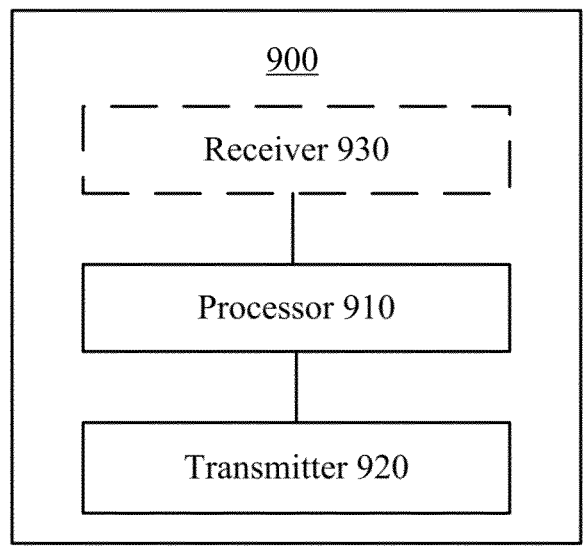
FIG. 9 is a schematic structural diagram of a base station according to an embodiment of the present invention.

FIG. 9 is a schematic structural diagram of a base station 900 according to an embodiment of the present invention. The base station 900 includes a processor 910 and a transmitter 920.

The processor 910 is configured to generate an RAR message. The RAR message includes a TA command and the TA command is at least 12 bits long, or the value of the TA command is greater than 1282. The transmitter 920 is configured to send the RAR message to a user equipment (UE). For example, the UE may use the TA command for uplink time alignment.

According to the embodiment of the present invention, the base station may send to the UE the TA command whose length is at least 12 bits or whose value is greater than 1282 in the RAR message, so that the UE is capable of using a larger amount of time alignment when performing time alignment, and thereby cell coverage over a comparatively longer distance is supported.

Alternatively, as another embodiment, the value of the TA command is any integer ranging from 1282 to 2047, and the TA command is 11 bits long.

Alternatively, as another embodiment, the TA command is 12 bits long, and the value of the TA command is any integer ranging from 1282 to 4095.

Alternatively, as another embodiment, the transmitter 920 is further configured to send a first indication information to the UE. The first indication information is used to indicate the length of the TA command that the UE needs to use to perform uplink time alignment.

Alternatively, as another embodiment, the RAR message includes the first indication information.

Alternatively, as another embodiment, the transmitter 920 sends a message including the first indication information to the UE before sending an RAR message to the UE.

Alternatively, as another embodiment, the transmitter 920 sends a message including the first indication information to the UE when the UE hands over between the base station and a second base station.

Alternatively, as another embodiment, the base station 900 further includes a receiver 930, where the transmitter 920 further sends information to the UE in a subframe n, where n is an integer, the receiver 930 receives from the UE a feedback message for the information in a subframe n+k, where the k is an integer greater than or equal to 5; and the receiver 930 receives information from the UE in the subframe n, and the transmitter 920 sends to the UE a feedback message for the information in the subframe n+k.

Alternatively, as another embodiment, the base station 900 sends information to the UE or receives information from the UE by using at least 2k−1 HARQ processes. And the transmitter 920 is further configured to send identification of each HARQ process to the UE, where the identification of each HARQ process is 4 bits long.

Alternatively, as another embodiment, the transmitter 920 sends to a UE a second indication information when the UE hands over from a second base station to the base station. The second indication information is used to indicate that when handing over to the base station, the UE should send to the base station a feedback message for information in a subframe n+k.

Alternatively, as another embodiment, the transmitter 920 sends to a UE a second indication information when the UE hands over from the base station to a second base station. The second indication information is used to indicate that when handing over to the second base station, the UE should send to the second base station, in a subframe n+j, a feedback message for information received from the second base station.

Alternatively, as another embodiment, the transmitter 920 sends to a UE a fourth indication information when the UE hands over from a second base station to the base station. The fourth indication information is used to indicate that when handing over to the base station, the UE should receive from the base station a feedback message for information in a subframe n+k.

Alternatively, as another embodiment, the transmitter 920 sends to a UE a fourth indication information when the UE hands over from the base station to a second base station. The fourth indication information is used to indicate that when handing over to the second base station, the UE should receive from the second base station, in a subframe n+j, feedback information for the information sent by the UE to the second base station.

It should be noted that the transmitter 920 and the receiver 930 connect to their respective antennas.

For operations and functions of all units of the base station 900, references may be made to steps 110 and 120 of the method shown in FIG. 1. To avoid repetition, the details will not be described herein again.

Figure 10:
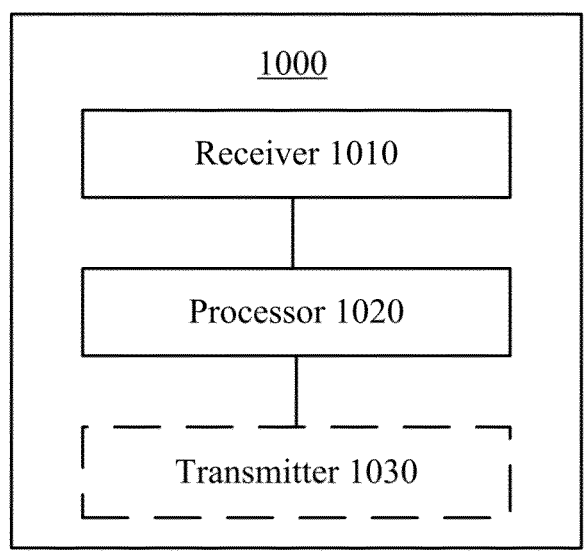
FIG. 10 is a schematic structural diagram of a UE according to another embodiment of the present invention.

FIG. 10 is a schematic structural diagram of a UE 1000 according to another embodiment of the present invention. The UE 1000 includes a receiver 1010 and a processor 1020.

The receiver 1010 is configured to receive an RAR message sent by a base station. The RAR message includes a TA command and the TA command is at least 12 bits long, or the value of the TA command is greater than 1282. The processor 1020 is configured to perform uplink time alignment according to the value of the TA command.

According to the embodiment of the present invention, the base station may send to the UE the TA command whose length is at least 12 bits or whose value is greater than 1282 in the RAR message, so that the UE is capable of using a larger amount of time alignment when performing time alignment, and thereby cell coverage over a comparatively longer distance is supported.

Alternatively, as another embodiment, the value of the TA command is any integer ranging from 1282 to 2047, and the TA command is 11 bits long.

Alternatively, as another embodiment, the TA command is 12 bits long, and the value of the TA command is any integer ranging from 1282 to 4095.

Alternatively, as another embodiment, the receiver 1010 receives a third indication information from the base station, where the third indication information is used to indicate the length of the TA command that the UE needs to use to perform uplink time alignment.

Alternatively, as another embodiment, the RAR message includes the first indication information.

Alternatively, as another embodiment, the receiver 1010 receives a message including the first indication information from the base station before receiving the RAR message from the base station.

Alternatively, as another embodiment, the receiver 1010 receives a message including the first indication information from the base station when the UE hands over between the base station and a second base station.

Alternatively, as another embodiment, the UE 1000 further includes a transmitter 1030, where the receiver 1010 receives information from the base station in a subframe n, and n is an integer; and the transmitter 1030 sends to the base station a feedback message for the information in a subframe n+k, where k is an integer greater than or equal to 5.

Alternatively, as another embodiment, the UE 1000 further includes a transmitter 1030, where the transmitter 1030 sends information to the base station in a subframe n, and the receiver 1010 receives from the base station a feedback message for the information in a subframe n+k.

Alternatively, as another embodiment, the receiver 1010 receives information from the base station by using at least 2k−1 HARQ processes or the transmitter 1030 sends information to the base station by using at least 2k−1 HARQ processes. The receiver 1010 is further configured to receive identification of each HARQ process from the base station, where the identification of each HARQ process is 4 bits long.

Alternatively, as another embodiment, the receiver 1010 receives a fourth indication information from the base station or a second base station when the UE hands over from the second base station to the base station. The fourth indication information is used to indicate that when handing over to the base station, the UE should receive from the base station a feedback message for information in a subframe n+k.

Alternatively, as another embodiment, the receiver 1010 receives a fourth indication information from the base station or a second base station when the UE hands over from the base station to the second base station. The fourth indication information is used to indicate that when handing over to the second base station, the UE should receive from the second base station, in a subframe n+j, feedback information for the information sent by the UE to the second base station.

Alternatively, as another embodiment, the receiver 1010 receives a second indication information from the base station or a second base station when the UE hands over from a second base station to the base station. The second indication information is used to indicate that when handing over to the base station, the UE should send a feedback message for information in subframe n+k.

Alternatively, as another embodiment, the receiver 1010 receives a second indication information from the base station or a second base station when the UE hands over from the base station to a second base station. The second indication information is used to indicate that when handing over to the second base station, the UE should send to the second base station, in a subframe n+j, a feedback message for the information received from the second base station.

It should be noted that the receiver 1010 and the transmitter 1030 connect to their respective antennas.

For operations and functions of all units of the UE 1000, references may be made to steps 210 and 220 of the method shown in FIG. 2. To avoid repetition, the details will not be described herein again.

Figure 11:
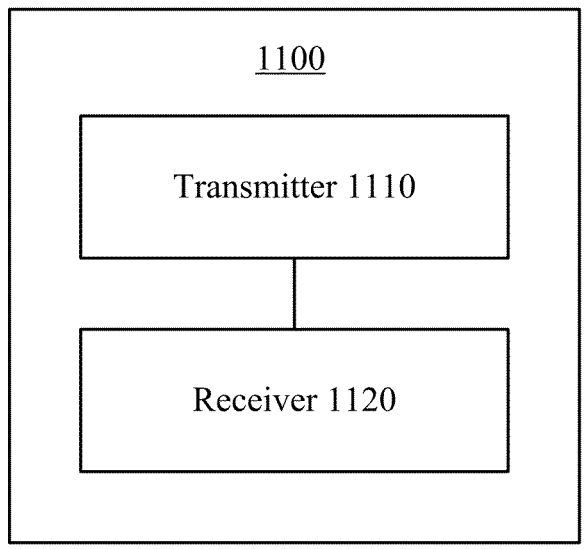
FIG. 11 is a schematic structural diagram of a communication equipment according to another embodiment of the present invention.

FIG. 11 is a schematic structural diagram of a communication equipment 1100 according to another embodiment of the present invention. The communication equipment 1100 includes a transmitter 1110 and a receiver 1120. The communication equipment 1100 is a first communication equipment.

The transmitter 1110 is configured to send information to a second communication equipment in a subframe n, where n is an integer. The receiver 1120 is configured to receive from the second communication equipment a feedback message for the information in a subframe n+k, where k is an integer greater than or equal to 5.

According to the embodiment of the present invention, the time interval, between sending information by the first communication equipment and sending a feedback message for the information by the second communication equipment, may be expanded by modifying the HARQ time sequence, and increasing the air interface processing delay that a system is capable of tolerating, and thereby cell coverage over a comparatively longer distance is supported.

Alternatively, as another embodiment, the transmitter 1110 is further configured to send information by using at least 2k−1 HARQ processes.

Alternatively, as another embodiment, the receiver 1120 is further configured to receive information by using at least 2k−1 HARQ processes.

Alternatively, as another embodiment, the first communication equipment is a base station, and the second communication equipment is a UE. The transmitter 1110 resends the information or sends new information to the UE according to the feedback message in any subframe following the subframe n+k.

Alternatively, as another embodiment, the first communication equipment is a base station, and the second communication equipment is a UE. Transmitter 1110 sends identification of each HARQ process to the UE, where the identification of each HARQ process is 4 bits long.

Alternatively, as another embodiment, the first communication equipment is a base station, and the second communication equipment is a UE. The transmitter 1110 sends to the UE a second indication information when the UE hands over from a second base station to the base station. The second indication information is used to indicate that when handing over to the base station, the UE should send to the base station a feedback message for information in a subframe n+k.

Alternatively, as another embodiment, the first communication equipment is a base station, and the second communication equipment is a UE. The transmitter 1110 sends to the UE a second indication information when the UE hands over from the base station to a second base station. The second indication information is used to indicate that when handing over to the second base station, the UE should send to the second base station, in a subframe n+j, a feedback message for information received from the second base station.

Alternatively, as another embodiment, the first communication equipment is a UE, and the second communication equipment is a base station. The UE resends the information or sends new information to the base station according to the feedback message in a subframe n+2k.

Alternatively, as another embodiment, the first communication equipment is a UE, and the second communication equipment is a base station. The receiver 1120 receives a fourth indication information from the base station or a second base station when the UE hands over from the second base station to the base station. The fourth indication information is used to indicate that when handing over to the base station, the UE should receive from the base station, in a subframe n+k, a feedback message for the information.

Alternatively, as another embodiment, the first communication equipment is a UE, and the second communication equipment is a base station. The receiver 1120 receives a fourth indication information from the base station or a second base station when the UE hands over from the base station to the second base station. The fourth indication information is used to indicate that when handing over to the second base station, the UE should receive from the second base station, in a subframe n+j, feedback information for information sent by the UE to the second base station.

Alternatively, as another embodiment, the first communication equipment is a UE and the second communication equipment is a base station, or the first communication equipment is a base station and the second communication equipment is a UE.

Alternatively, as another embodiment, the first communication equipment may communicate with the second communication equipment, and the first communication equipment may be a peer equipment of the second communication equipment.

It should be noted that the transmitter 1110 and the receiver 1120 connect to their respective antennas.

For operations and functions of all units of the communication equipment 1100, references may be made to steps 510 and 520 of the method shown in FIG. 5. To avoid repetition, the details will not be described herein again.

Figure 12:
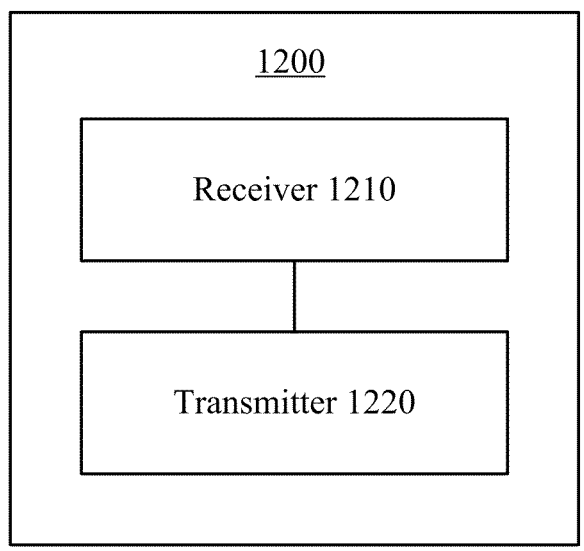
FIG. 12 is a schematic structural diagram of a communication equipment according to another embodiment of the present invention.

FIG. 12 is a schematic structural diagram of a communication equipment 1200 according to another embodiment of the present invention. The communication equipment 1200 includes a receiver 1210 and a transmitter 1220. The communication equipment 1200 is a second communication equipment.

The receiver 1210 is configured to receive information from a first communication equipment in a subframe n, where n is an integer. The transmitter 1220 is configured to send a feedback message for the information to the first communication equipment in a subframe n+k, where k is an integer greater than or equal to 5.

According to the embodiment of the present invention, the time interval, between sending information by the first communication equipment and sending a feedback message for the information by the second communication equipment, may be expanded by modifying the HARQ time sequence, and increasing the air interface processing delay that a system is capable of tolerating, and thereby cell coverage over a comparatively longer distance is supported.

Alternatively, as another embodiment, the receiver 1210 is further configured to receive information by using at least 2k−1 HARQ processes, or the transmitter 1220 is further configured to send information by using at least 2k−1 HARQ processes.

Alternatively, as another embodiment, the first communication equipment is a base station, and the second communication equipment is a UE. The UE receives the information resent by or new information sent by the base station in any subframe following the subframe n+k, according to the feedback message.

Alternatively, as another embodiment, the second communication equipment is a UE, and the first communication equipment is a base station. The receiver 1210 receives identification of each HARQ process from the base station, where the identification of each HARQ process is 4 bits long.

Alternatively, as another embodiment, the first communication equipment is a base station, and the second communication equipment is a UE. The receiver 1210 receives a second indication information from the base station or a second base station when the UE hands over from a second base station to the base station. The second indication information is used to indicate that when handing over to the base station, the UE should send a feedback message for information in a subframe n+k.

Alternatively, as another embodiment, the first communication equipment is a base station, and the second communication equipment is a UE. The receiver 1210 receives a second indication information from the base station or a second base station when the UE hands over from a second base station to the base station. The second indication information is used to indicate that when handing over to the coverage of the second base station, the UE should send to the second base station, in a subframe n+j, a feedback message for information received from the second base station.

Alternatively, as another embodiment, the first communication equipment is a UE, and the second communication equipment is a base station. The base station receives the information resent or new information sent by the UE in a subframe n+2k.

Alternatively, as another embodiment, the first communication equipment is a UE, and the second communication equipment is a base station. The transmitter 1220 sends to the UE a fourth indication information when the UE hands over from a second base station to the base station. The fourth indication information is used to indicate that when handing over to the base station, the UE should receive from the base station a feedback message for information in a subframe n+k.

Alternatively, as another embodiment, the first communication equipment is a UE, and the second communication equipment is a base station. The transmitter 1220 sends to the UE a fourth indication information when the UE hands over from the base station to a second base station. The fourth indication information is used to indicate that when handing over to the second base station, the UE should receive from the second base station, in a subframe n+j, feedback information of the information sent by the UE to the second base station.

Alternatively, as another embodiment, the second communication equipment is a UE and the first communication equipment is a base station, or the second communication equipment is a base station and the first communication equipment is a UE.

Alternatively, as another embodiment, the first communication equipment may communicate with the second communication equipment, and the first communication equipment may be a peer equipment of the second communication equipment.

It should be noted that the receiver 1210 and the transmitter 1220 connect to their respective antennas.

For operations and functions of all units of the communication equipment 1200, references may be made to steps 610 and 620 of the method shown in FIG. 6. To avoid repetition, the details will not be described herein again.

An embodiment of the present invention further provides a communication system which may include the user equipment and the base station described in aforementioned embodiments.

According to the embodiments of the present invention, the range of the value of the TA command defined in the LTE protocol is expanded. The range of the value of the defined TA command is expanded to 0-2047, which is capable of supporting access to a cell with coverage over a distance of 160 km.

According to the embodiments of the present invention, the length of the TA command defined in the LTE protocol is expanded. A reserved bit is used to expand the length of the TA command to 12 bits, and the range of the value of the TA command is 0-4095, which is capable of supporting access to a cell with coverage over a distance of 320 km.

As to coverage over an extremely long distance (>100 km) in the FDD-LTE system, according to the embodiments of the present invention, considering that a comparatively great time cost is increased due to air interface processing delay, the number of HARQ processes is therefore increased to 10 and the HARQ time sequence is changed to n+5. This expands the tolerable air interface processing time to 5 ms, and thereby normal HARQ feedback processing and normal data transmission processing of the FDD-LTE system are supported.

It should be noted that, the embodiments of the present invention may also be used for terminal access and HARQ communication time sequence in a scenario with coverage over an extremely long distance in another communication system.

Persons of ordinary skill in the art may appreciate that, in combination with the examples described in the embodiments herein, units and algorithm steps can be implemented by electronic hardware, computer software, or a combination thereof. Whether the functions are executed by hardware or software depends on particular applications and design constraint conditions of the technical solutions. Persons skilled in the art can use different methods to implement the described functions for every particular application, but it should not be considered that the implementation goes beyond the scope of the present invention.

It can be clearly understood by persons skilled in the art that, for the purpose of convenient and brief description, for a detailed working process of the foregoing system, apparatus and unit, reference may be made to the corresponding process in the method embodiments, and the details will not be described herein again.

In the embodiments provided in the present application, it should be understood that the disclosed system, apparatus, and method may be implemented in other modes. For example, the described apparatus embodiments are merely exemplary. For example, the unit division is merely logical function division and can be other division in actual implementation. For example, multiple units or components can be combined or integrated into another system, or some features can be ignored or not performed. In addition, the displayed or discussed mutual couplings or direct couplings or communication connections are implemented through some interfaces. The indirect couplings or communication connections between the apparatuses or units may be implemented in electronic, mechanical or other forms.

The units described as separate parts may or may not be physically separate, and parts displayed as units may or may not be physical units, and may be located in one position, or may be distributed on multiple network elements. A part or all of the units may be selected according to the actual needs to achieve the objectives of the solutions of the embodiments.

In addition, functional units in the embodiments of the present invention may be integrated into a processing unit, or each of the units may exist alone physically, or two or more units are integrated into a unit.

When being implemented in the form of a software function unit and sold or used as a stand-alone product, the functions may be stored in a computer-readable storage medium. Based on such understanding, the technical solutions of the present invention essentially, or the part contributing over the prior art, or a part of the technical solutions may be implemented in a form of a software product. The computer software product is stored in a storage medium and includes several instructions for instructing a computer device (which may be a personal computer, a server, or a network device, and the like.) to execute all or a part of steps of the methods described in the embodiments of the present invention. The storage medium includes: any medium that can store program codes, such as a U-disk, a removable hard disk, a read-only memory (Read-Only Memory, ROM for short), a random access memory (Random Access Memory, RAM for short), a magnetic disk, or an optical disk.

The foregoing descriptions are merely exemplary embodiments of the present invention, but not intended to limit the present invention. Any variation or replacement made by persons skilled in the art without departing from the present invention shall fall within the protection scope of the present invention. Therefore, the protection scope of the present invention shall be subject to the appended claims.

What is claimed is:

1. A method of facilitating random access of a user equipment (UE), the method comprising:
receiving a physical random access channel (PRACH) preamble sequence being sent by the UE;
generating a random access response (RAR) in response to the PRACH preamble sequence, the RAR comprising a timing advance (TA) command, the TA command including an integer value that is greater than 1282, the integer value alone being sufficient to allow determination of a TA supporting the UE to perform a uplink time alignment; and
sending the RAR to the UE.

2. The method of claim 1, wherein the integer value is represented by a number of bits, the method furthering comprising informing the UE of the number of bits provided for representation of the integer value.

3. The method of claim 2, wherein the informing is performed in a handover process of the UE.

4. The method of claim 1, further comprising:
sending a first message to the UE in a subframe n; and
receiving a first feedback message in a subframe n+k, wherein the first feedback message is in response to the first message, n is an integer, and k is an integer equal to or greater than 5.

5. The method of claim 4, further comprising resending the first message to the UE in a subframe following the subframe n+k.

6. The method of claim 1, further comprising:
informing the UE of a hybrid automatic repeat request (HARQ) time sequence;
sending a first message to the UE in a subframe n; and
receiving a first feedback message in response to the first message, depending on the HARQ time sequence the first feedback message being received in either subframe n+4 or subframe n+5.

7. The method of claim 1, further comprising:
receiving a second message being sent by the UE in a subframe n; and
sending a second feedback message in a subframe n+k, wherein the second feedback message is in response to the second message, n is an integer, and k is an integer equal to or greater than 5.

8. The method of claim 1, further comprising communicating with the UE via at least 2k−1 hybrid automatic repeat request (HARQ) processes, k being an integer equal to or greater than 5.

9. The method of claim 8, further comprising informing the UE of an identification of each of the HARQ processes via at least 4 bits information.

10. The method of claim 1, wherein the TA command provides 11 bits for representation of the integer value.

11. The method of claim 1, wherein the TA command provides 12 bits for representation of the integer value.

12. An apparatus, comprising at least one processor configured to:
receive a physical random access channel (PRACH) preamble sequence being sent by a user equipment (UE);
inform the UE of a number of bits provided for representation of an integer value comprised in a timing advance (TA) command;

generate a random access response (RAR) in response to the PRACH preamble sequence, the RAR comprising the TA command, the TA command including the integer value, the integer value being greater than 1282, the integer value alone being sufficient to allow determination of a TA supporting the UE to perform a uplink time alignment; and send the RAR to the UE.

13. The apparatus of claim 12, wherein the UE is informed in a handover process of the UE.

14. The apparatus of claim 12, wherein the at least one processor is further configured to:

send a first message to the UE in a subframe n; and receive a first feedback message in a subframe n+k, wherein the first feedback message is in response to the first message, n is an integer, and k is an integer equal to or greater than 5.

15. The apparatus of claim 12, wherein the at least one processor is further configured to:

inform the UE a hybrid automatic repeat request (HARQ) time sequence;

send a first message to the UE in a subframe n; and receive a first feedback message in response to the first message, depending on the HARQ time sequence the first feedback message being received in either subframe n+4 or subframe n+5.

16. The apparatus of claim 12, wherein the at least one processor is further configured to:

receive a second message being sent by the UE in a subframe n; and send a second feedback message in a subframe n+k, wherein the second feedback message is in response to the second message, n is an integer, and k is an integer equal to or greater than 5.

17. The apparatus of claim 12, wherein the at least one processor is further configured to communicate with the UE via at least 2k−1 hybrid automatic repeat request (HARQ) processes, k being an integer equal to or greater than 5.

18. The apparatus of claim 17, wherein the at least one processor is further configured to inform the UE an identification of each of the HARQ processes via at least 4 bits information.

19. A system, comprising a base station (BS) for communication with a user equipment (UE), wherein the BS is configured to receive a physical random access channel (PRACH) preamble sequence that is sent by the UE;

generate a random access response (RAR) in response to the PRACH preamble sequence, the RAR comprising a timing advance (TA) command, the TA command including an integer value that is greater than 1282, the integer value alone being sufficient to allow determination of a TA supporting the UE to perform a uplink time alignment; and send the RAR to the UE.

* * * * *